United States Patent [19]
Bunger et al.

[11] 3,753,070
[45] Aug. 14, 1973

[54] PROTECTIVE CIRCUIT FOR ELECTRIC MOTORS

[75] Inventors: Franz Bunger, Mannheim; Karl-Heinz Lehmann, Oftersheim, both of Germany

[73] Assignee: Brown, Boveri & Cie Aktiengesellschaft, Mannheim, Germany

[22] Filed: Dec. 6, 1971

[21] Appl. No.: 205,246

[30] Foreign Application Priority Data
Dec. 9, 1970 Germany............... P 20 60 483.5

[52] U.S. Cl. .............................. 318/472, 317/13 B
[51] Int. Cl. .................................... H02h 7/085
[58] Field of Search................. 318/471, 472, 473; 317/13 B, 13 C

[56] References Cited
UNITED STATES PATENTS

| | | | |
|---|---|---|---|
| 3,280,373 | 10/1966 | Dabinett | 317/13 C |
| 3,324,352 | 6/1967 | Hover | 317/13 C |
| 3,530,337 | 9/1970 | Moore | 317/13 C |
| 3,555,356 | 1/1971 | Kaiser | 317/13 C |
| 2,986,685 | 5/1961 | Epstein | 318/472 X |
| 3,209,206 | 9/1965 | Courtin | 317/13 C |
| 3,575,637 | 4/1971 | Krieger | 317/13 C |

Primary Examiner—B. Dobeck
Attorney—John J. McGlew et al.

[57] ABSTRACT

The protective circuit is used in a switching arrangement for protecting an electric motor against thermal overload, and of the type including a heating resistor in the motor supply circuit, a temperature sensing resistor, having a highly temperature-dependent resistance characteristic, in heat transfer contact with the heating resistor and a motor cut-off control means connected to the temperature sensitive resistor to provide a signal voltage for disconnecting the motor from its source of potential upon thermal overloading of the motor. The heating resistor has a thermal behavior simulating the thermal behavior of the motor to be protected. A bias voltage is applied to the input of an amplifier of the cut-off control means, and this bias voltage can be set on a potentiometer and is influenced by an additional temperature-dependent resistor to compensate the room temperature at the location of the switching arrangement. The arrangement may be used with either a direct current motor supply, a single phase AC motor supply, or a polyphase AC motor supply.

10 Claims, 5 Drawing Figures

PROTECTIVE CIRCUIT FOR ELECTRIC MOTORS

FIELD OF THE INVENTION

This invention relates to motor protecting circuits and, more particularly, to a novel and improved protective circuit for electric motors including a heating resistor, in the motor supply circuit, having a thermal behavior simulating the thermal behavior of the motor to be protected.

BACKGROUND OF THE INVENTION

It is known to design switching arrangements, for the protection of consuming apparatus, with a temperature-dependent resistor which is in heat contact with a resistor arranged in the main current supply circuit of the consuming apparatus, such as shown in German published application 1,563,572. The variation of the resistance of the temperature-dependent resistor is used to control a discharge lamp which influences a photoelectric resistor which, in turn, controls a relay winding. It is also known to provide polyphase protective devices with parallel-connected temperature-dependent resistors.

A futher expedient known to those skilled in the art is to provide protective motor relays with an electronic control device which effects a delayed disconnection in the case of excess currents, and with the delay depending on the amount of excess current, as disclosed in "Technische Mitteilingen AEG/ Telefunken 59" (1969) No. 6, pp. 388-392.

In electric motors, it is generally desired to utilize a minimum of material and to design for a minimum volume. Consequently, the motors frequently are highly loaded and work with high operating temperatures. In the case of overloading of a hot motor, it must be disconnected after a relatively short delay. However, when a motor is started cold, a longer period of overload is admissible, and frequently desirable, because of the required driving energy. In this case, the motor protecting circuit should provide a longer delay before cutting out the motor.

Such a difference of the delay time before cutting out the motor, on the basis of the starting state of the motor, has been attained to a certain degree in motor protecting switches with thermally responsive bimetals. In protecting circuits for large motors, such thermoelectric bimetals must be very large and complicated, however. Motor protecting switches or circuits, with electronic control devices, have the disadvantage that the delay times are merely load-dependent and do not take into account the actual temperature state of the motor.

SUMMARY OF THE INVENTION

The objective of the invention is to provide a switching arrangement or circuit, for the protection of electric motors against thermal overloading, with a response device which utilizes effectively the admissible or permissible overload range of the motor.

In accordance with the invention, this problem is solved by arranging a heating resistor in the main circuit, with this heating resistor simulating, in its thermal behavior, the thermal behavior of the motor. The volume and the heat insulation are so designed that time constants of longer than a few minutes are obtained.

In a further development of the invention, a substantially instantaneous excess current cut-off is arranged additionally in the motor supply circuit, and effects an immediate disconnection in the case of a short circuit.

The design of the cut-off control device embodying the invention is characterized in that a base bias voltage is applied to the input of an amplifier of the cut-off control device. The base bias voltage can be set on a potentiometer, and is influenced by an additional temperature-dependent resistor, for compensation of the room temperature at the location of the switching arrangement, for example in a switch cabinet.

The protective circuit of the invention is suitable for single phase motors, but it can be used also for polyphase motors, since a respective heating resistor and associated temperature-sensing resistor, with the latter having a highly temperature-dependent resistance characteristic, is assigned to each supply conductor. The temperature-sensing resistors are combined with a variable resistor to form a voltage divider, and the signal voltages are applied, through an OR circuit, to the cut-off control device. By means of the variable voltage divider resistors, it is possible to balance the deviations of the various elements. The measuring devices constituted by the resistors thus can be balanced separately for each phase. The OR circuit has the effect that the maximum signal voltage is effective at the input of the cut-off control device, so that a lower signal, present in one phase having a lower load, does not result in any influence due to parallel connection.

In yet another development of the invention, the OR circuit is formed by multiple diodes, which has the advantage that the response value of the voltage dividers formed in the branches is a multiple of the breakdown voltage of a single diode, so that a faster rise of the signal voltage, in the response region, is attained.

The motor protecting circuit preferably is so designed that the rated motor current is set on a potentiometer which changes the base bias voltage of the amplifier of the cut-off control device. The potentiometer shaft can be provided with an index which cooperates with a scale calibrated in rated current values.

As an advantageous further development of the invention, an artificially formed neutral point is provided in the supply conductors and connected through a rectifier to the input of the cut-off control device, and this supplies an additional signal voltage responsive to a voltage drop in one or two supply conductors. This arrangement provides protection against phase failure.

An advantageous embodiment of the protecting circuit of the invention is characterized by the circuit being designed as an attachment for relays, motor switches, or both. In this case, the protective device is connected electrically and mechanically to terminals of the relay, or of the motor switch, with prongs which project from the protective device and which fit into the receptacle tape terminals of the relay or motor switch. The protective device has, in turn, terminals for connection to the supply conductors.

This further development of the protective circuit embodying the invention is characterized by a housing having two shells, the part on the main current side and the main connections being arranged in one housing shell and the parts of the cut-off control device, with the respective connecting means, of a power pack and the terminals of the control contact being arranged in the other housing shell.

An object of the invention is to provide an improved protecting circuit for protecting electric motors against thermal overloading.

Another object of the invention is to provide such a protective circuit in which a heating resistor, connected in the motor supply circuit, has a thermal response simulating that of the motor to be protected.

A further object of the invention is to provide such a protective device operable to effect immediate disconnection of the motor in the event of a short circuit.

For an understanding of the principles of the invention, reference is made to the following description of a typical embodiment thereof as illustrated in the accompanying drawing.

DESCRIPTION OF THE PREFERRED EMBODIMENT

Figure 1:
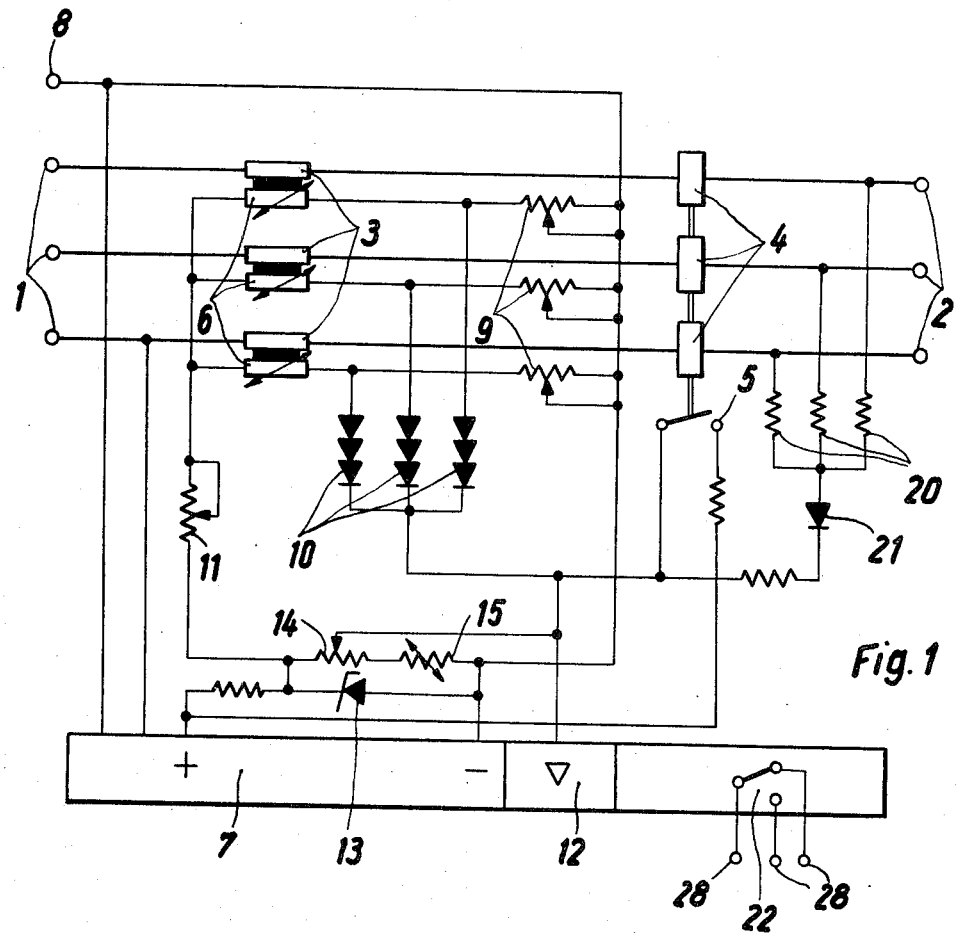
FIG. 1 is a schematic wiring diagram of the principal circuit of the protective arrangement embodying the invention.
Figure 2:
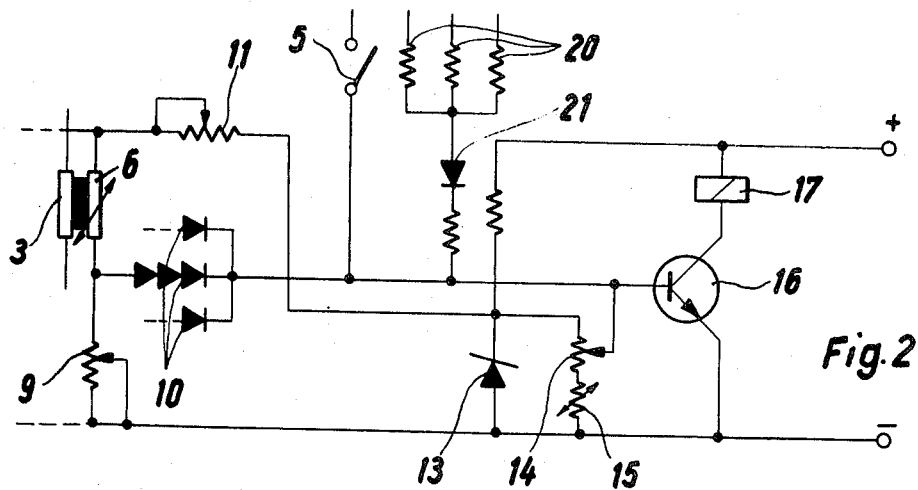
FIG. 2 is a schematic wiring diagram of the cut-off control device and illustrating the connection of the signal-transmitting elements.

Referring to FIGS. 1 and 2, for connection of the live main current lines there are provided two groups of terminals 1 and 2, between which there are arranged heating resistors 3. Instantaneous motor disconnecting elements are also connected in the main supply lines, and are indicated as relay coils 4 whose armatures act conjointly on a switch 5.

In heat transfer contact with the heating resistors 3, there are arranged temperature-sensing resistors 6 having a highly temperature-dependent resistance characteristic. The current supply for the cut-off control device is provided from a power pack 7 which is supplied from the main supply lines or throuh a neutral conductor terminal 8.

The temperature-sensing resistors 6 form, with the variable resistors 9, which serve to adjust the tolerances of the resistors 3 and 6 as well as the heat transfer contact, voltage dividers whose junction points are combined, through respective multiple diodes 10, so that the voltage at the junction points is applied to th input of an amplifier 12. In this connection, the temperature-sensing resistors 6 supply the signal voltage for the cut-off control device.

The input of amplifier 12 has applied thereto a bias voltage which is set on a potentiometer 14, from a voltage stabilized by means of a Zener diode 13. An additional temperature-dependent resistor 15 is connected in series with potentiometer 14 to compensate the ambient temperature.

FIG. 2 illustrates the connections of the elements generating the signal voltage, as well as of the elements generating the bias voltage for a transistor 16 which forms, together with a relay 17, the amplifier 12. With the potentiometer 11, it is possible to vary the response value of the cut-off control device so that the rated current motor of the motor protecting circuit can be set with this potentiometer. Potentiometer 11 is externally adjustable by means of a knob 18, shown in FIG. 5, and cooperable with a scale 19, on the housing 26, for fine setting.

For additional protection against phase failure, three resistors 20 are connected in the motor supply lines, and combined to an artifical neutral point which is connected, through a diode 21 and a series resistor, to the input of amplifier 12. Since the negative terminal of amplifier 12 is connected, through power pack 7, to the neutral conductor terminal 8, an AC voltage appears at the neutral point if the voltage fails in one or two of the main current conductors. This activates amplifier 12 throgh diode 21 and the associated resistor. The no-delay devices 4 close switch 5 when a short circuit current appears, so that the input of amplifier 12 is likewise activated.

The method of operation of the control device will now be described. In the case of excess current, one or more heating resistors 3 are heated. The temperature-sensing resistors 6, which are in heat transfer contact with the respective heating resistors, become low ohmic, so that the junction points of the voltage dividers receive a higher positive voltage. This voltage is applied, through multiple diodes 10, to the input of amplifier 12, and triggers transistor 16 conductive. The collector current of transistor 16 effects directly, or through an additional amplifier element, actuation of relay 17 to operate its control contact 22. Control contact 22 effects disconnection of the motor to be protected, for example by interrupting the current supply to a relay connected in advance of the motor.

Figure 3:
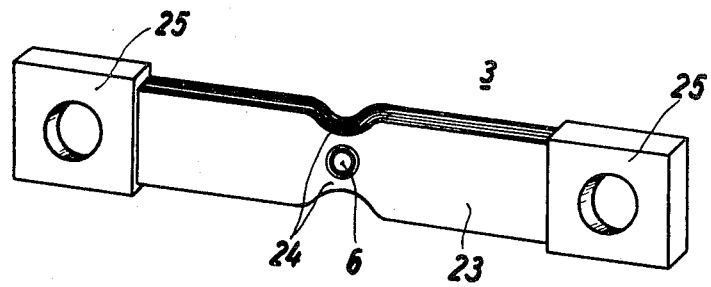
FIG. 3 is a perspective view of the heating resistor, arranged in the motor supply circuit, and illustrating the temperature-dependent resistor in heat transfer contact with the heating resistor.
Figure 4:
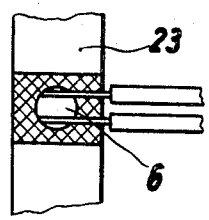
FIG. 4 is an elevation view, partly in section, illustrating the arrangement of the temperature-sensing resistor in the heating conductor of the heating resistor.

FIG. 3 illustrates the construction of heating resistor 3 with the associated temperature-sensing resistor 6 in heat transfer contact therewith. Heating resistor 3 comprises resistance material 23 whose cross-section has a constriction 24 in the proximity of temperature-sensing resistor 6, so that the heating source is moved closer to the temperature-sensing resistor. The ends of the resistor material 23 are provided with terminals 25, which can also be designed as angles or to form terminals for feed lines. Temperature-sensing resistor 6 is placed in a bore or recess in the resistance material 23, and embedded with a temperature-resistance means, as shown in FIG. 4.

Figure 5:
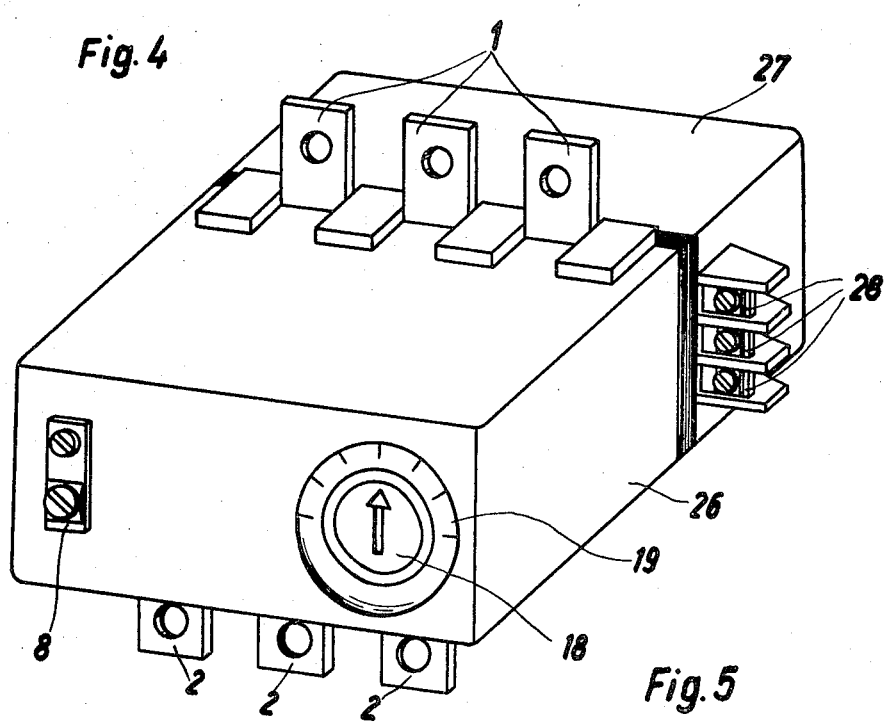
FIG. 5 is a perspective view illustrating the mechanical construction of the protective circuit.

FIG. 5 illustrates the protective circuit designed as a compact device in a shell construction. One housing shell 26 contains the two groups of terminals 1 and 2. One group of these terminals may be connected directly to the terminals of a motor switch or of a relay, while the other group of connections are designed per se as terminals and serve for connection to the main supply conductors or to the electric motor. Housing shell 26 also contains a neutral conductor terminal 8 as well as mounting knob 18 of potentiometer 11 and the associated scale 19. In housing shell 26, there are also arranged the other parts of the main circuits, such as the heating resistors 3, the release devices 4 operating the switch 5, the temperature-sensing resistors 6 and the resistors 9.

In the other housing shell 27, there are arranged the parts of the cut-off control device, of the power pack 7, of amplifier 12, and terminals 28 of the control switch 22.

While a specific embodiment of the invention has been shown and described in detail to illustrate the application of the principles of the invention, it will be understood that the invention may be embodied otherwise without departing from such principles.

What is claimed is:

1. In a switching arrangement for protecting an electric motor against thermal overload, of the type including a heating resistor in a motor supply circuit including supply conductors, a temperature-sensing resistor, having a highly temperature-dependent resistance characteristic, in heat transfer contact with the heating resistor, and motor cut-off control means connected to the temperature-sensitive resistor to provide a signal voltage: the improvement comprising said heating resistor being in a conductor of said supply circuit externally of and separate from the motor, and having a thermal behavior simulating the thermal behavior of the motor to be protected.

2. In a switching arrangement for protecting an electric motor against thermal overload, the improvement claimed in claim 1, including substantially instantaneously operable overload current detecting means connected in said supply circuit and operable to supply a signal to said motor cut-off control means, to protect said motor against short-circuiting.

3. In a switching arrangement for protecting an electric motor against thermal overload, the improvement claimed in claim 1, in which said motor cut-off control means includes an amplifier having an input; a source of control potential; a potentiometer connected between said source and the input of said amplifier and operable to set the base bias of said amplifier input; and an additional temperature-dependent resistor operatively connected to said potentiometer to compensate the ambient temperature at the locus of said switching arrangement.

4. In a switching arrangement for protecting an electric motor against thermal overload, the improvement claimed in claim 1, in which said motor is a polyphase motor and said supply circuit is a polyphase supply circuit; a respective heating resistor connected in each conductor of said supply circuit; a respective temperature-sensing resistor in heat transfer contact with each heating resistor; a respective separately variable resistor connected in series with each temperature-sensing resistor at a junction point to form a voltage divider; and means commonly connecting said junction points to the input of said motor cut-off control means.

5. In a switching arrangement for protecting an electric motor against thermal overload, the improvement claimed in claim 4, in which said last-named means is an OR circuit.

6. In a switching arrangement for protecting an electric motor against thermal overload, the improvement claimed in claim 5, in which said OR circuit is constituted by sets of multiple diodes with each set being connected to a respective junction point.

7. In a switching arrangement for protecting an electric motor against thermal overload, the improvement claimed in claim 4, including a potentiometer connected to those terminals of said temperature-sensing resistors remote from said junction point, and connected to the input of said cut-off control means; said potentiometer being operable to adjust the magnitude of the circuit-breaking current.

8. In a switching arrangement for protecting an electric motor against thermal overload, the improvement claimed in claim 4, including resistors connected to the conductors of said supply circuit and interconnected at a common point to form an exact mean value of the voltage of the polyphase conductors and a rectifier connecting said common point to the input of said cut-off control means.

9. In a switching arrangement for protecting an electric motor against thermal overload, the improvement claimed in claim 1, in which said switching arrangement is constructed and arranged as a unit attachment having terminals for connection into said supply circuit and to motor controlling switch means.

10. In a switching arrangement for protecting an electric motor against thermal overload, the improvement claimed in claim 9, in which said attachment comprises a housing having two housing shells; one housing shell mounting the terminals for connection of said switching arrangement into said supply circuit, a potentiometer for adjusting the rated current, and a scale cooperable with an index of said potentiometer; the other housing shell containing the parts of said cut-off control means and the parts of a power pack, and mounting terminals of a motor cut-off switch.

* * * * *